(12) United States Patent
Feng et al.

(10) Patent No.: US 9,114,359 B2
(45) Date of Patent: Aug. 25, 2015

(54) METHOD FOR PRODUCING SORBENTS FOR $CO_2$ CAPTURE UNDER HIGH TEMPERATURES

(75) Inventors: Bo Feng, Fairfield (AU); Wenqiang Liu, St. Lucia (AU)

(73) Assignee: THE UNIVERSITY OF QUEENSLAND, St. Lucia, Queensland (AU)

( * ) Notice: Subject to any disclaimer, the term of this patent is extended or adjusted under 35 U.S.C. 154(b) by 0 days.

(21) Appl. No.: 13/128,696

(22) PCT Filed: Nov. 11, 2009

(86) PCT No.: PCT/AU2009/001465
§ 371 (c)(1),
(2), (4) Date: Aug. 8, 2011

(87) PCT Pub. No.: WO2010/054427
PCT Pub. Date: May 20, 2010

(65) Prior Publication Data
US 2012/0025134 A1    Feb. 2, 2012

(30) Foreign Application Priority Data

Nov. 11, 2008 (AU) .................................. 2008905817

(51) Int. Cl.
| | |
|---|---|
| *B01J 20/04* | (2006.01) |
| *B01D 53/62* | (2006.01) |
| *B01D 53/81* | (2006.01) |
| *B01J 20/06* | (2006.01) |
| *B01J 20/28* | (2006.01) |
| *B01J 20/32* | (2006.01) |
| *B01J 20/34* | (2006.01) |
| *C01B 13/18* | (2006.01) |
| *C01F 7/16* | (2006.01) |
| *C01F 11/04* | (2006.01) |
| *C01F 11/06* | (2006.01) |
| *B01J 20/30* | (2006.01) |

(52) U.S. Cl.
CPC ................ *B01D 53/62* (2013.01); *B01D 53/81* (2013.01); *B01J 20/041* (2013.01); *B01J 20/06* (2013.01); *B01J 20/28059* (2013.01); *B01J 20/3078* (2013.01); *B01J 20/3204* (2013.01); *B01J 20/3236* (2013.01); *B01J 20/3433* (2013.01); *B01J 20/3483* (2013.01); *C01B 13/185* (2013.01); *C01F 7/164* (2013.01); *C01F 11/04* (2013.01); *C01F 11/06* (2013.01); *B01D 2251/402* (2013.01); *B01D 2251/404* (2013.01); *B01D 2251/60* (2013.01); *B01D 2253/306* (2013.01); *B01D 2257/30* (2013.01); *B01D 2257/504* (2013.01); *C01P 2002/72* (2013.01); *C01P 2002/85* (2013.01); *C01P 2004/03* (2013.01); *C01P 2006/12* (2013.01); *C01P 2006/14* (2013.01); *C01P 2006/16* (2013.01); *Y02C 10/04* (2013.01); *Y02C 10/08* (2013.01)

(58) Field of Classification Search
CPC .............................. B01J 20/04; B01J 20/041
USPC .......................................... 252/184; 423/230
See application file for complete search history.

(56) References Cited

U.S. PATENT DOCUMENTS

| | | | |
|---|---|---|---|
| 5,180,703 A | 1/1993 | Ziebarth et al. | |
| 5,395,805 A * | 3/1995 | Droege et al. ................... | 501/12 |
| 5,866,090 A | 2/1999 | Nakagawa et al. | |
| 6,080,281 A | 6/2000 | Attia | |
| 6,620,763 B1 | 9/2003 | Venkataramani et al. | |
| 7,199,078 B2 | 4/2007 | Berris et al. | |
| 7,314,847 B1 | 1/2008 | Siriwardane | |

FOREIGN PATENT DOCUMENTS

| | | |
|---|---|---|
| CN | 1 676 210 | 10/2005 |
| KR | 100293204 | 4/2001 |
| WO | WO 2009/144472 | 12/2009 |

OTHER PUBLICATIONS

International Search Report for PCT/AU2009/001465, mailed Jan. 29, 2010.
Written Opinion of the International Searching Authority for PCT/AU2009/001465, mailed Jan. 29, 2010.
Feng, B. et al.,"Overcoming the problem of loss-in-capacity of calcium oxide in $CO_2$ capture", Energy & Fuels, vol. 20, (2006), pp. 2417-2420.

* cited by examiner

*Primary Examiner* — Peter F Godenschwager
(74) *Attorney, Agent, or Firm* — Nixon & Vanderhye P.C.

(57) ABSTRACT

A method of producing a $CO_2$ adsorbent and $CO_2$ adsorbents. The method including the steps of: (a) producing a mixture of at least one calcium salt and at least one metal support cation in at least one solvent; (b) drying the mixture to produce a solid containing a calcium metal salt; and (c) calcining the dried solid to produce a sorbent of calcium oxide dispersed in a porous metal support.

14 Claims, 19 Drawing Sheets

METHOD FOR PRODUCING SORBENTS FOR CO₂ CAPTURE UNDER HIGH TEMPERATURES

This application is the U.S. national phase of International Application No. PCT/AU2009/001465, filed 11 Nov. 2009, which designated the U.S. and claims priority to AU Application No. 2008905817 filed 11 Nov. 2008, the entire contents of each of which are hereby incorporated by reference.

FIELD OF THE INVENTION

The present invention relates to a method of producing sorbents, particularly for the capture of $CO_2$. The method and resulting sorbents find particular use in high temperature processes.

BACKGROUND OF THE INVENTION

Global warming due to the emission of $CO_2$ into the atmosphere is a public concern. This, combined with the possible introduction of commercial incentives to limit greenhouse gases, particularly atmospheric carbon, $CO_2$ control technologies are in demand. Electricity and heat generation account for 41% of the total $CO_2$ emissions in 2005, and the demand will be doubled by 2030 according to the World Energy Outlook projects. One method to reduce $CO_2$ emissions by power generation sectors of industry is the use of non-carbon power generation, such as by hydropower and nuclear power generation. However, fossil fuels currently are the most important sources of world electricity and heat generation, providing 70% of the generation. This is particularly so for coal, which supplied 39% of the electricity generation in 2005, and which is sufficiently abundant to be used for the next 130 years at the coal production rates of 2007. This suggests that clean coal technology, which includes the process known as $CO_2$ capture and storage (CCS), is likely to be an important part of the solution to reduce $CO_2$ emissions.

Under a CCS system, $CO_2$ is captured from coal power plants and then transported and stored rather than being emitted to the atmosphere. There are a range of factors affecting the application of CCS and two important ones are the technical maturity and costs. The $CO_2$ capture process is the most expensive component in most CCS systems. Therefore it is critical to develop low-cost $CO_2$ capture technologies to make the commercialization of CCS possible. In fact, in order for the $CO_2$ capture technologies to be widely adopted, they must ideally bring economic gain rather than loss.

One alternative is the development of new systems of power generation with in-situ $CO_2$ capture. In these systems, $CO_2$ capture materials are used under high temperatures. Examples of such systems include the zero emission coal technology proposed by the Zero-Emission Coal Alliance (ZECA) with a claimed efficiency of 68%, and the Japanese Hydrogen Production by Reaction Integrated Novel Gasification process (HyPr-RING) with a claimed plant efficiency of over 53%. In these systems, the $CO_2$ capture material plays a very important role in enhancing the overall efficiency of the systems. When coal or natural gas is gasified (reformed) together with the $CO_2$ capture material, high purity hydrogen is produced while $CO_2$ is captured in the material. Then, the hydrogen, free of $CO_2$, may be used a source of carbon-free energy to generate power. These and other techniques are referred to as advanced zero emission power (AZEP) generation technologies.

Another particularly important use of a $CO_2$ capture material would be in sorption-enhanced steam methane reforming (SE-SMR). In SE-SMR, natural gas is reformed with pressurised steam and oxygen in a reforming reactor to produce synthesis gas (CO+$H_2$). If a $CO_2$ capture material is also added into the reactor, high purity hydrogen will be generated, and the $H_2$ may then be used separately as a source of energy.

A further important application of a $CO_2$ capture material is in $CO_2$ separation from a gas mixture. When the gas mixture is passed through a reactor bed of $CO_2$ capture material, $CO_2$ will be captured by the material while the rest of the mixture will exit the reactor (assuming the other gases in the mixture do not react with the material). Thus, the application of the capture material in post-combustion capture of $CO_2$ in the flue gas of coal-fired power plants is possible. Obviously, other uses for a $CO_2$ capture material can be envisaged.

From a commercial perspective, the $CO_2$ capture material should ideally (a) be sufficiently robust that it can be recycled numerous times without any appreciable loss of performance in terms of its $CO_2$ capture and liberation abilities (known as reversibility), (b) have a fast reaction rate, and (c) have a high capture capacity. Some suitable sorbents for $CO_2$ capture at high temperature have been identified in the art to be $Li_2ZrO_3$/$Li_4SiO_4$ and CaO. CaO is cheap and widely available which makes it very attractive.

Indeed, CaO has been identified to be thermodynamically one of the most suitable materials for $CO_2$ capture at high temperatures (eg in the range of about 300° C. to about 700° C.) due to its fast reaction rate and high capture capacity at those conditions. Additionally, it can be used either on its own or in combination with other minerals, where CaO is the main component. The reactions involved in the $CO_2$ capture process can be described by equations (1) and (2).

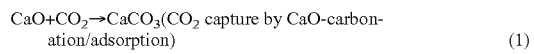

$$CaO+CO_2 \rightarrow CaCO_3 (CO_2 \text{ capture by CaO-carbonation/adsorption}) \qquad (1)$$

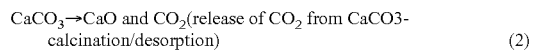

$$CaCO_3 \rightarrow CaO \text{ and } CO_2 (\text{release of } CO_2 \text{ from } CaCO_3\text{-calcination/desorption}) \qquad (2)$$

However, the $CO_2$ capture capacity and reversibility of CaO and CaO-based materials reduces after a few carbonation/calcination cycles. This is believed to be due to the $CaCO_3$ undergoing sintering at the high temperature required for calcination. Sintering is a phenomenon where the $CaCO_3$ crystals adhere to each other and results in a decrease in reaction surface area of the sorbent, which results in lower capture capacity for $CO_2$ in the next carbonation cycle.

It would be desirable for the problems with the currently available $CO_2$ capture materials, and particularly CaO systems, to be avoided or at least alleviated or ameliorated.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The inventors have found that the incorporation of CaO into an inert porous metal oxide produces a sorbent with desirable properties.

Accordingly, in one aspect, the present invention relates to a method of producing a $CO_2$ adsorbent, the method including the steps of:

(a) producing a mixture of at least one calcium salt and at least one metal support cation in at least one solvent;

(b) drying the mixture to produce a solid containing the calcium metal salt; and (c) calcining the dried solid to produce a sorbent of calcium oxide dispersed in a porous metal support.

The calcium salt in the mixture of step (a) may be produced by the addition of one or more of calcium, calcium organic salt, or calcium oxide (CaO) to a solvent to dissolve the calcium ions. The metal support cation in the mixture of step (a) may be produced by the addition of metal, organometallic salt, or metal oxide to a solvent to dissolve the metal ions. The solvent will vary depending on the particular calcium salt and metal support cations in the mixture. It is preferable that the solvent is appropriately selected to allow substantially complete dissolution of the salt in the solvent. Further, it is preferable that sufficient solvent is provided in the method so that there is substantially complete dissolution of the salt in the solvent.

After calcination, the CaO is substantially un-sintered and is dispersed in, on, or among a porous metal support. The skilled person will understand the meaning of dispersed in this context and given FIG. 14 and the process steps taken to form the $CO_2$ adsorbent. Briefly, the CaO is distributed among the porous metal support, and the porous metal support is distributed among the CaO. Preferably, this distribution is uniform, in that it is substantially evenly spread. More preferably, the CaO crystals or grains are more separated from each other by porous metal support, eg MgO, than those in CaO $CO_2$ capture materials of the prior art. For example, the CaO crystals or grains may be about 150 nm in diameter, while the MgO crystals or grains that separate them may be about 30 nm in diameter. Other size particles will also work and can be prepared by design. The porous metal support is preferably inert to the $CO_2$ capture process.

In one embodiment of the invention, the mixture is produced by mixing a calcium organic salt (as the calcium salt) with at least one organometallic salt (as the metal support cation) in a solvent. The calcium organic salt preferably has an anion selected from the group consisting of acetate, benzoate, propionate, citrate, lactate, gluconate, formate and stearate. The organometallic salt may be derived from a metal such as magnesium, aluminium, silicon, titanium, lanthanum, cerium, zirconium, or hafnium have an anion selected from the same group as the calcium organic salt (ie the group consisting of acetate, benzoate, propionate, citrate, lactate, gluconate, formate and stearate). Preferably, the metal ion is magnesium, aluminium, silicon or titanium. Suitable solvents for the mixture are water, mineral or organic acid, or a low molecular weight alcohol.

In another embodiment of the invention, the mixture is produced by mixing a CaO (as the calcium salt) with at least one metal oxide (as the metal support cation) in a solvent. The metal oxide may be selected from the group consisting of magnesium oxide (MgO), aluminium oxide, silicon oxide, titanium oxide, lanthanum trioxide, cerium oxide, zirconium oxide, hafnium oxide or compounds/minerals containing any of these oxides. Preferably, the metal ion is magnesium, aluminium, silicon or titanium. A suitable solvent is an organic acid, more preferably one selected from the group consisting of acetic acid, benzoic acid, propionic acid, citric acid, lactic acid, gluconic acid, formic acid and stearic acid.

In an alternative to the above embodiment, the CaO and metal oxide may be provided for in a mineral containing both CaO and the metal oxide. The calcium and metal oxide content in the mineral is preferably substantially completely dissolved in the organic acid, and the solution/mixture dried and calcined to form the CaO supported in a porous metal support.

A preferred form of mineral containing both CaO and MgO is dolomite.

The calcium salt is preferably calcium D-gluconate monohydrate, calcium acetate hydrate, calcium citrate tetrahydrate, calcium L-lactate hydrate, or calcium formate. More preferably, the calcium salt is calcium D-gluconate monohydrate or calcium acetate hydrate. Most preferably, the calcium salt is calcium D-gluconate monohydrate.

It is preferable that the calcium salt is added in an amount that results in greater than 0 wt % and up to a maximum of about 95 wt % of CaO in the final solid $CO_2$ adsorbent material. More preferably, the final solid $CO_2$ adsorbent material includes at least about 10 wt % CaO, 30 wt % CaO, 52 wt % CaO, or 55 wt % CaO. More preferably still, the final solid $CO_2$ adsorbent material includes more than about 65 wt % CaO, 67 wt % CaO, 70 wt % CaO, or 75 wt % CaO. Preferably, the final solid $CO_2$ adsorbent material includes less than about 85 wt % CaO, or 83 wt % CaO. For instance, the calcium salt may be added in an amount that results in greater than about 67 wt % and up to a maximum of about 95 wt % of CaO in the final solid $CO_2$ adsorbent material. Or, the calcium salt may be added in an amount that results in greater than about 67 wt % and up to a maximum of about 85 wt % of CaO in the final solid $CO_2$ adsorbent material. Or, the calcium salt may be added in an amount that results in greater than about 67 wt % and up to a maximum of about 83 wt % of CaO in the final solid $CO_2$ adsorbent material. The porous metal support material is preferably MgO lanthanum trioxide, cerium oxide, zirconium oxide, hafnium oxide or aluminium oxide or mixtures thereof. MgO is most preferred. A $CO_2$ adsorbent made with calcium and MgO is referred to herein as a calcium magnesium oxide (CMO) sorbent.

The calcination is conducted at a temperature of from about 650° C. to about 1000° C., with the preferred temperature being typically about 900° C., preferably in the presence of inert gas or atmosphere. The duration of the calcination would be known to those skilled in the art, and, for instance, may be about 30 min. Importantly, despite the calcination temperature being greater than the Tammann temperature of the CaO, the inventors believe that the sintering of the CaO is at least hindered by the presence of the MgO.

The $CO_2$ adsorbent is not limited to $CO_2$ capture, but can also be used for, for instance, desulphurisation due to the CaO being an active sulphur capture component.

The $CO_2$ sorbents of the present invention are particularly suited to high temperature application. In particular, the temperature may be above about 300° C. More particularly, the temperature may be above about 500° C. and range as far as about 880° C. (providing the upper temperature is lower than the sintering temperature of the metal support).

In a further aspect of the invention there is provided a $CO_2$ adsorbent including
  greater than 0 wt % to about 95 wt % calcium oxide; and
  about 5 to less than 100 wt % of a metal oxide, the metal being selected from the group consisting of magnesium, aluminium, silicon, titanium, lanthanum, cerium, zirconium and hafnium;
wherein the calcium oxide is dispersed amongst the metal oxide support.

Preferably, the metal ion is magnesium, aluminium, silicon or titanium.

In this aspect the $CO_2$ adsorbent may include about 10 to about 85 wt % calcium oxide and about 15 to about 90 wt % metal oxide, and preferably about 67 to about 85 wt % calcium oxide and about 15 to about 33 wt % metal oxide. More preferably, the $CO_2$ adsorbent may include about 67 to about 83 wt % calcium oxide and about 17 to about 33 wt % metal oxide.

In a further aspect of the invention there is provided a calcined $CO_2$ adsorbent including
  greater than 0 wt % to about 95 wt % calcium oxide; and
  about 5 to less than 100 wt % of a metal oxide, the metal being selected from the group consisting of magnesium, aluminium, silicon, titanium, lanthanum, cerium, zirconium and hafnium;
wherein the calcium oxide is substantially un-sintered and is dispersed amongst the metal oxide support.

Preferably, the metal ion is magnesium, aluminium, silicon or titanium.

In this aspect the $CO_2$ adsorbent may include about 10 to about 85 wt % calcium oxide and about 15 to about 90 wt % metal oxide, and preferably about 67 to about 85 wt % calcium oxide and about 15 to about 33 wt % metal oxide. More preferably, the $CO_2$ adsorbent may include about 67 to about 83 wt % calcium oxide and about 17 to about 33 wt % metal oxide.

Another aspect of the invention provides a $CO_2$ adsorbent formed from the dissolution of a mixture of at least one calcium salt and at least one metal support cation in at least one solvent; drying the mixture to produce a solid containing a calcium metal salt; and calcining the dried solid to produce a sorbent of calcium oxide dispersed in a porous metal support.

An advantage of the present invention is that the resultant $CO_2$ adsorbent typically has a greater porosity than that of a $CO_2$ adsorbent prepared by a prior art method (which is generally from about 10 $m^2$/g to about 20 $m^2$/g in BET surface area). Preferably, the $CO_2$ adsorbent as the present invention has BET surface area of greater than about 20 $m^2$/g. More preferably, the $CO_2$ adsorbent as the present invention has BET surface area of greater than about 30 $m^2$/g, or more preferably still has a BET surface area of at least about 70 $m^2$/g.

DETAILED DESCRIPTION OF THE PREFERRED EMBODIMENTS

Figure 1:
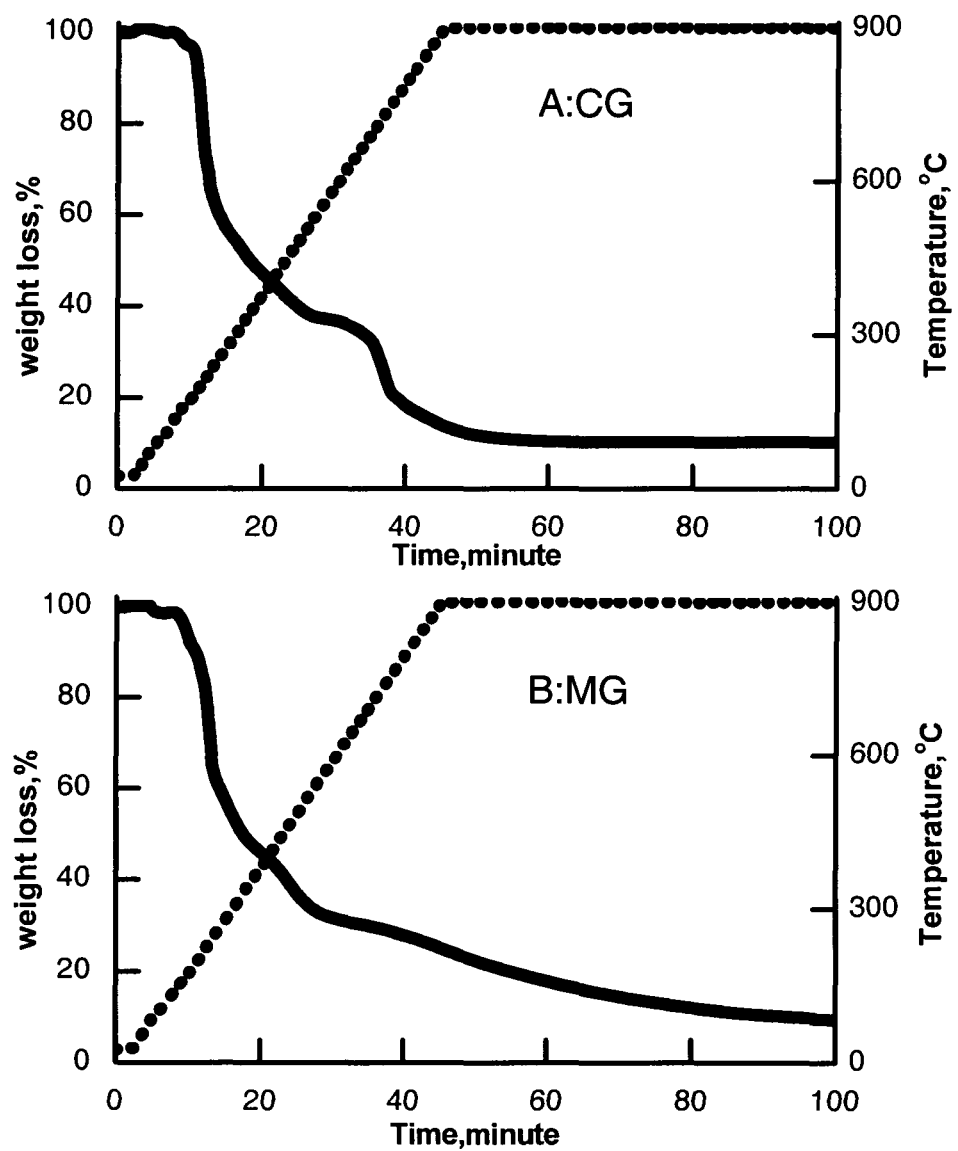
FIG. 1 shows the decomposition of calcium D-gluconate monohydrate (CG) and magnesium D-gluconate hydrate (MG).

The invention is described below predominantly with reference to the inert porous metal support being MgO. However, as it would be appreciated by the skilled person, other materials may be substituted for, or used in conjunction with, MgO.

CMO sorbents were synthesised having CaO supported on MgO. Without wishing to be bound by theory, it is believed that the MgO component within the sorbent is non-reactive with $CaCO_3$ at the reaction conditions, and thus functions as an inert porous that separates the CaO (ie its crystals or grains). It is believed by the inventors that the sintering of $CaCO_3$ in the $CO_2$ loaded sorbent is largely hindered because the CaO grains inside the sorbent are separated by MgO. That is, the method of the present invention produces ultrafine CaO particles uniformly separated by an inert support material. Such a CMO sorbent can be reliably used over a number of cycles with less reduction in reversibility as compared to prior art CaO systems. For instance, a CMO of the present invention was used over a number of cycles without any appreciable reduction in capabilities at an adsorption temperature of 650° C. and a desorption temperature of 900° C. It is believed that CMO materials prepared according to the method of the invention have a substantially uniform distribution of separated CaO grains over a MgO support, and that this contributes to their superior performance over naturally occurring CaMgO minerals which are not uniformly distributed.

1. Preparation of the CMO Sorbent

The preparation of the CMO sorbent in accordance with an embodiment of the invention is described as follows:

1. A calcium salts was selected as a precursor from the group consisting of calcium acetate, calcium benzoate, calcium propionate, calcium citrate, calcium lactate, calcium gluconate, calcium formate or calcium stearate. In the examples illustrated in the Figures, the calcium salt precursors were calcium acetate hydrate (CA, approx. 99%, Sigma-Aldrich), calcium L-lactate hydrate (CL, ≥98%, Fluka), calcium formate (CF, ≥99%, Fluka) and calcium D-gluconate monohydrate (CG, ≥98%, Sigma-Aldrich).
2. At least one metal support cation was selected as a precursor from the group where the metal is magnesium, aluminium, silicon or titanium and the anion is selected from the group consisting of acetate, benzoate, propionate, citrate, lactate, gluconate, formate or stearate (ie the same anions as for the calcium salt). In the examples illustrated in the Figures, the metal support cation precursors were magnesium acetate tetrahydrate (MA, >99%, Amresco), magnesium L-lactate hydrate (ML, ≥95%, Fluka) and magnesium D-gluconate monohydrate (MG, ≥98%, Sigma).
3. Pre-determined amounts of calcium salts and magnesium salts were substantially completely dissolved in a common solvent such as distilled water, respectively. The amounts of both salts was pre-determined from the desired CaO content, ie preferably from above 0 to about 83 wt %, within the total final CMO sorbent.
4. The two solutions were heated to promote dissolution of the salts in the respective solvent, and then they were mixed together in a common container.
5. The container was placed on a hot plate and the mixture was stirred for a period of time, say 1 hour, at a constant temperature. Suitable temperatures range from about room temperature to about 300° C. Stirring and heating in this step are optional.
6. The mixture was then dried at a temperature of higher than about 100° C. until there is complete evaporation of the solvent, in this case water, to form a dry solid containing calcium and magnesium salts. Depending on the salts initially used the mixture produced may be, for example, calcium magnesium acetate (CMA) or a mixture of calcium acetate and magnesium lactate (CAML). The drying step may be done in accordance with known batch or continuous drying methods. The drying temperature may be lower but the process will take longer to complete.
7. The dried solid was collected from the container and ground, preferably in a ball mill or using a mortar and pestle, to form a fine powder. The grinding process is optional.
8. The dried solid was calcined for 30 minutes at a temperature of between about 650° C. to about 1000° C. with the preferred temperature being typically about 900° C., preferably in the presence of inert gas or atmosphere, to convert the calcium magnesium salts to CMO. This temperature range is typical for $CaCO_3$ decomposition in the sorbent. In some cases, new calcium-based compounds may be formed during this process. For example, $Ca_{12}Al_{14}O_{33}$ may be formed during this calcination process when the precursor of support is aluminium organic salt or aluminium oxide.
9. The as-obtained $CO_2$ adsorbent material is thus in a form which can be used as an active component for use as a $CO_2$ sorbent. Optionally, the material may undergo further processing to produce a $CO_2$ sorbent in a more easily handleable form, eg using commercial particle or pellet fabrication technologies, for example core-in-shell, spray dry or pelletization.

Determination of Masses of CMO Precursors Before Synthesis

The amounts of calcium precursors and support precursors were pre-determined from the desired CaO component, ranging from 10-95 wt %, within the final sorbents. When magnesium precursors were chosen as supports, the weight ratios between precursors and products were simply determined by experimental data as shown in Table S1. These ratios were obtained from the observations of decompositions of precursors in a Cahn thermogravimetric analyzer (TGA, model 121) at a heating rate of 20° C./min from room temperature to 900° C. in air/$N_2$. An example of TGA profile for decomposition process of the precursors is shown in FIG. 1 (calcium D-gluconate monohydrate and magnesium D-gluconate hydrate).

TABLE 1

Weight ratios between precursors and final products (CaO or MgO).

| Precursor | Calcination condition | Product | Weight ratio |
| --- | --- | --- | --- |
| calcium acetate hydrate (CA) | $N_2$, 900° C., 30 min | CaO | 3.1 |
| calcium L-lactate hydrate (CL) | $N_2$, 900° C., 30 min | CaO | 5.3 |
| calcium formate (CF) | Air, 900° C., 30 min | CaO | 2.3 |
| calcium D-gluconate monohydrate (CG) | Air, 900° C. 1.5 h | CaO | 9.5 |
| magnesium acetate tetrahydrate (MA) | $N_2$, 900° C., 30 min | MgO | 5.3 |

TABLE 1-continued

Weight ratios between precursors
and final products (CaO or MgO).

| Precursor | Calcination condition | Product | Weight ratio |
|---|---|---|---|
| magnesium L-lactate hydrate (ML) | $N_2$, 900° C., 30 min | MgO | 5.2 |
| magnesium D-gluconate hydrate (MG) | Air, 900° C., 1.5 h | MgO | 11.5 |

Testing of the CMO Sorbents Produced 13 different CMO sorbents produced in accordance with the method described above were tested with the results illustrated in FIGS. 2 to 5.

$CO_2$ chemisorption experiments were performed using a thermobalance (TGA, Cahn model 121). The procedure was as follows:

1. About 55 mg sorbent was added into the sample holder in a glass reactor.
2. The reactor was heated from room temperature to the carbonation temperature (650° C. in this study) at a heating rate of 20° C./min in $N_2$ of 85 ml/min.
3. When the carbonation temperature was reached, a 15 ml/min flow of $CO_2$ reactant gas (resulting 15% $CO_2$ concentration) was introduced into the TGA and the reactor was then maintained at 650° C. for 30 minutes.
4. Subsequently, $CO_2$ flow was discontinued and the reactor was heated to 900° C. at 20° C./min for calcination in $N_2$ of 85 ml/min. The temperature was kept constant for 10 minutes to ensure complete calcination.
5. The weight and temperature of the sample were continuously calculated from the weight change and used as indicators of $CO_2$ capture performance.
6. The multi cycles were repeated at the same carbonation and calcination conditions.

Figure 2:
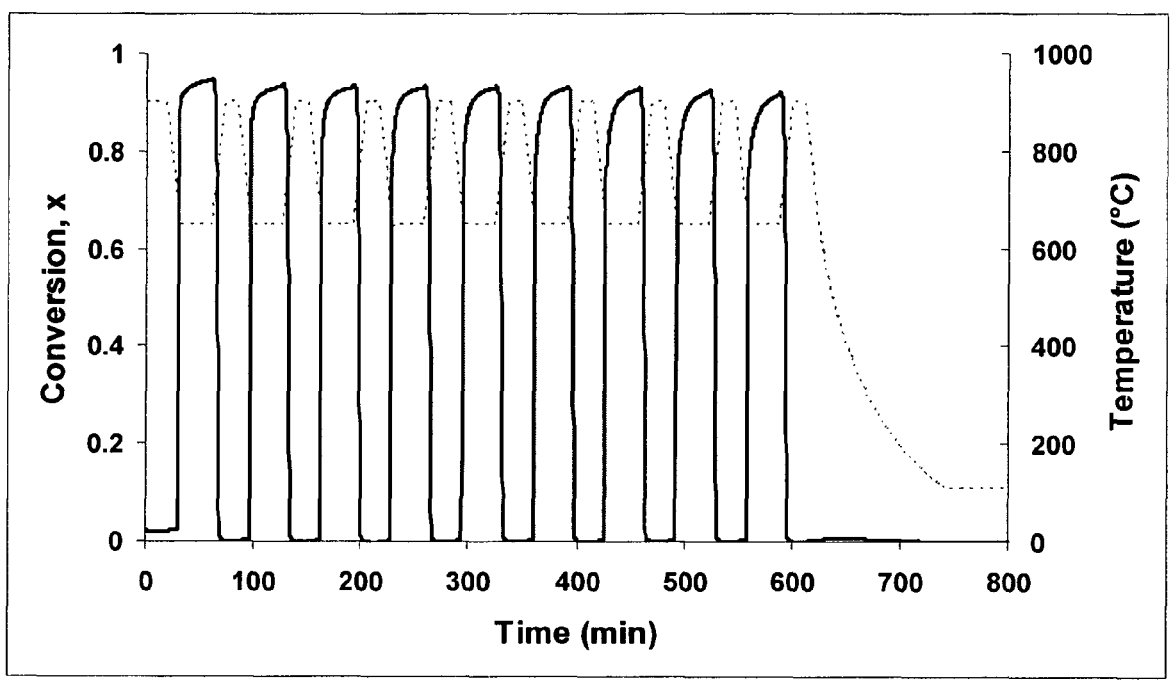
FIG. 2 is graph of CaO conversion when testing the adsorption and desorption of $CO_2$ using a sorbent formed according to the invention (CMO sorbent) over a number of cycles. CaO component of this sorbent is 55 wt %, and was prepared from precursors of calcium acetate and magnesium acetate. This sorbent is denoted as CAMA55. Experiment conditions: carbonation (ie adsorption) at 650° C. for 60 min with 15% $CO_2$; calcination (ie desorption) at 900° C. for 10 min with pure $N_2$.
Figure 3:
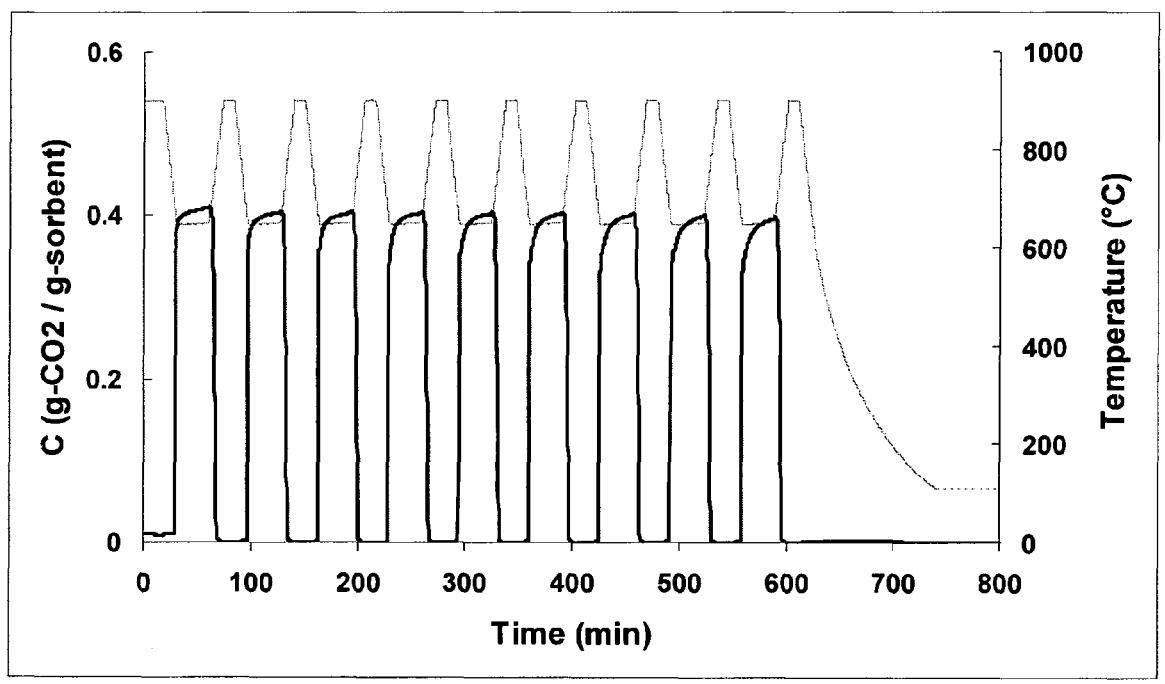
FIG. 3 is graph of the study shown in FIG. 2 showing mass of captured $CO_2$ per gram sorbent. The profile of $CO_2$ adsorption capacity of CMO sorbent over a number of cycles; $CO_2$ adsorption capacity, C, is defined as mass of adsorbed $CO_2$/mass of sorbent (unit: g-CO2/g-sorbent); Experiment conditions: carbonation (ie adsorption) at 650° C. for 60 min with 15% $CO_2$; calcination (ie desorption) at 900° C. for 10 min with pure $N_2$.
Figure 4:
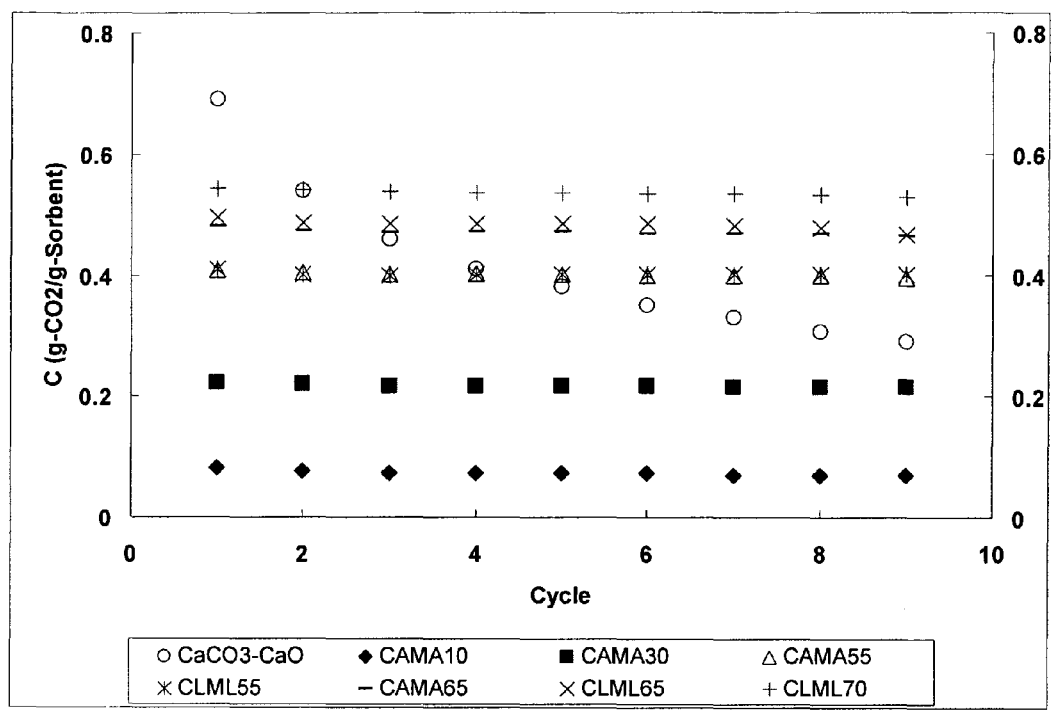
FIG. 4 is graph showing the sorbent $CO_2$ capture capacity over a number of cycles for CMOs formed in accordance with the method of the invention with Ca:Mg ratios varying from 10 wt % CaO to 70 wt % CaO; The sorbents were prepared from precursors where the organic anion of the calcium was the same as that of the magnesium, eg calcium acetate (CA) and magnesium acetate (MA). Other components were calcium lactate (CL) and magnesium lactate (ML). Experiment conditions: carbonation (ie adsorption) at 650° C. for 60 min with 15% $CO_2$; calcination (ie desorption) at 900° C. for 10 min with pure $N_2$.

FIGS. 2 and 3 show typical profiles of CaO conversion and captured $CO_2$ per gram sorbent over a number of cycles. These figures were drawn from the experimental results on a sorbent with 55 wt % CaO component, prepared from precursors of calcium acetate and magnesium acetate. This sorbent is denoted as CAMA55 and its maximum captured CO2 per gram sorbent during each cycle is shown in FIG. 4. The experimental conditions are carbonation at 650° C. for 60 min with 15% $CO_2$; calcination at 900° C. for 10 min with pure $N_2$.

In FIG. 2, the dashed line is the temperature profile and the solid line is the CaO conversion. The conversion X (mol/mol) is the molar ratio of the reacted CaO over the initial CaO. Theoretically, 56 mg CaO sorbent may capture a maximum mass of 44 mg $CO_2$. The conversion is calculated using the equation:

$$X=((m-m_0)/44)/(m_0 \cdot x\%/56),$$

Where m (mg) is the recorded mass of the solid products during reaction, $m_0$ (mg) is the initial mass of CMO sorbent; x % is mass proportion of CaO in the CMO sorbent.

In FIG. 3, the lighter dashed line is also the temperature profile, and the darker solid line is $CO_2$ capture capacity, C, which is defined as mass of adsorbed $CO_2$ per gram CMO sorbent.

FIGS. 2 and 3 show that this sorbent meets the chemical requirements of: 1) fast carbonation with $CO_2$ (about 90% conversion within a few minutes as shown in FIG. 2, 3), high $CO_2$ capture ability (about 0.4 g-$CO_2$/g-sorbent) when the CaO component (the active component to be reacted with $CO_2$) is 55 wt % in the sorbent as shown in FIG. 3.

It can be seen that CAMA55 sorbent produced in accordance with the method of the invention showed good reversibility, with almost constant capture capacities for 9 carbonation calcination cycles, as shown in FIG. 2 and FIG. 3.

Figure 5:
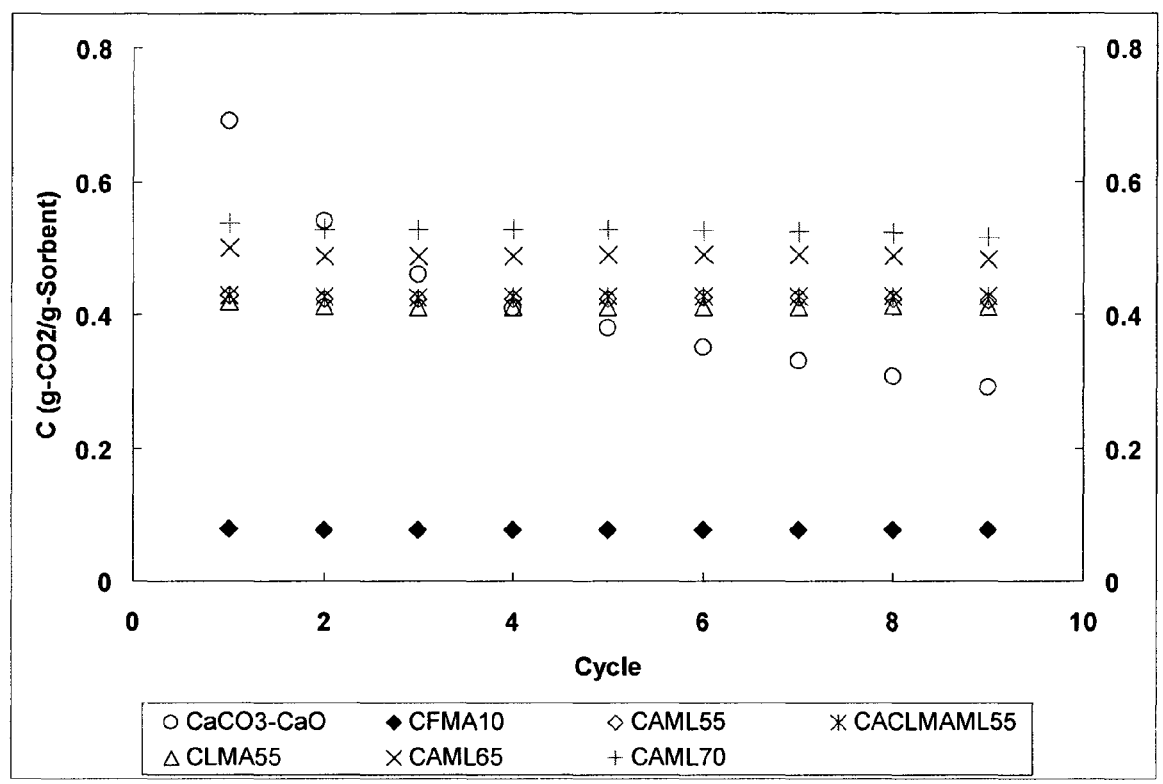
FIG. 5 is graph showing the sorbent $CO_2$ capture capacity over a number of cycles for CMOs formed in accordance with the method of the invention with Ca:Mg ratios varying from 10 wt % CaO to 70 wt % CaO; The sorbents were prepared from precursors where the organic anion of the calcium was different to that of the magnesium, eg calcium acetate (CA) and magnesium lactate (ML). Other components were calcium lactate (CL), magnesium acetate (MA), and calcium formate (CF). Experiment conditions: carbonation (ie adsorption) at 650° C. for 60 min with 15% $CO_2$; calcination (ie desorption) at 900° C. for 10 min with pure $N_2$.

In the drawings of FIGS. 4 and 5 the following notations are used to depict the following salts; CA: (calcium acetate), MA: (magnesium acetate) CL: (calcium lactate); CF: (calcium formate), and the numbers 10, 30, 55, 65, 70 are used to indicate the mass proportion of CaO in the CMO sorbent. For example, CAML65 means the sorbent with 65 wt % CaO loading prepared from calcium acetate and magnesium lactate.

FIGS. 4 and 5 illustrate the results of multicyclic performance of $CO_2$ capture capacity of 13 different sorbents produced in accordance with the method in this invention, compared to that of CaO decomposed from commercial $CaCO_3$. For clear comparisons, the maximum value of capture capacity, C (captured $CO_2$ per gram sorbent), within each cycle was shown in FIGS. 4 and 5 and the profile (those in FIGS. 2 and 3) was not shown. It can be seen from the results of capture and desorption cycle data that while the amount of captured $CO_2$ was at a level commensurate with the amount of CaO in the sorbent, the presence of the CaO in the sorbent dispersed uniformly throughout the porous MgO provided consistent and numerous adsorption of $CO_2$ over a number of cycles. All CaO conversions of the produced sorbents have been found to be over 90%. Figures also show that CaO decomposed from commercial $CaCO_3$ exhibits a fast decay of capture capacity.

Figure 6:
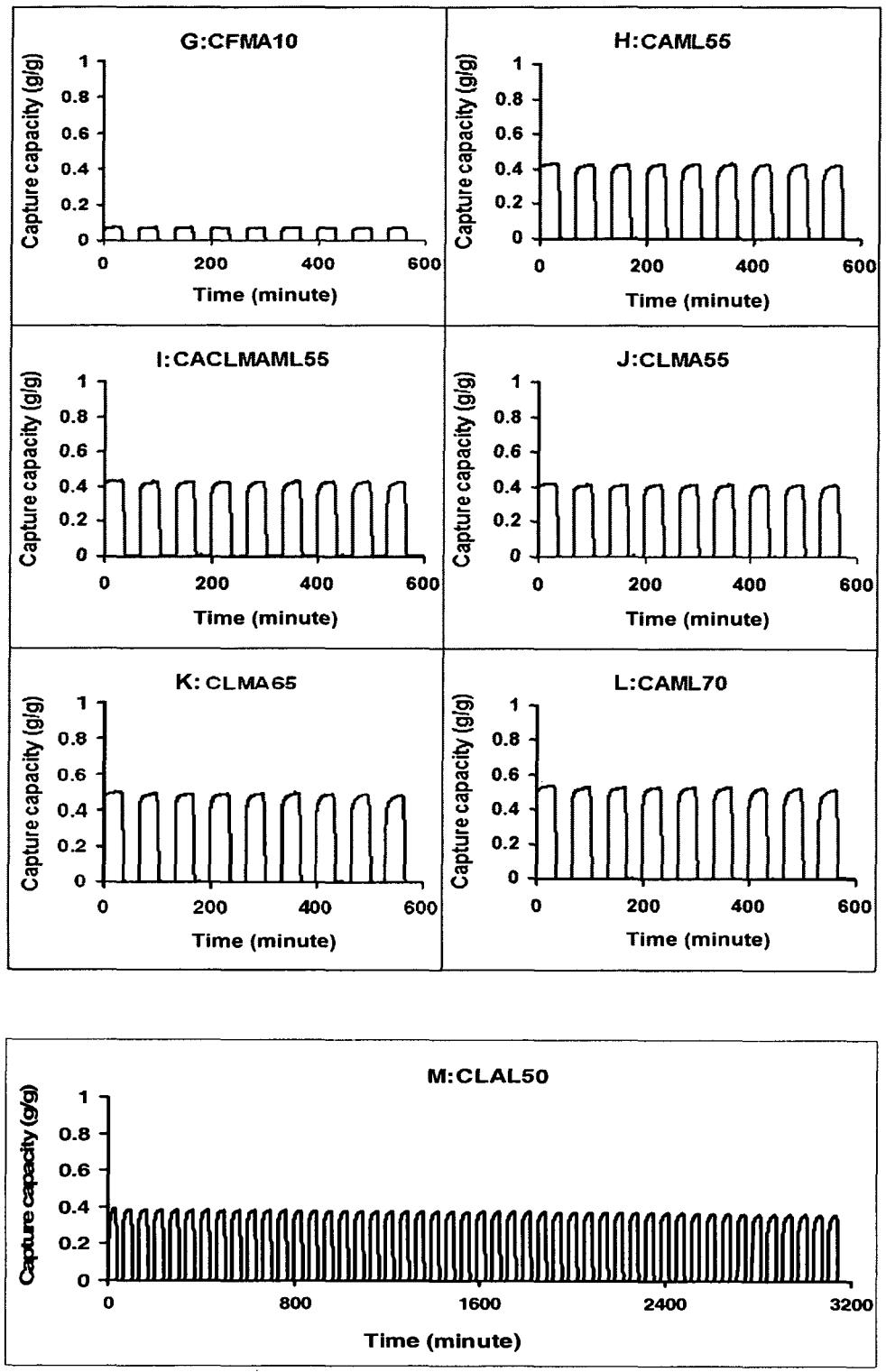
FIG. 6 shows TGA profiles of $CO_2$ capture capacity for sorbents synthesized from other precursors except CG and MG using the present method when tested under the conditions of AZEP and SE-SMR.

FIG. 6 shows TGA profiles of $CO_2$ capture capacity for sorbents synthesized from these precursors using the method of the invention and when tested under the conditions of AZEP and SE-SMR.

Figure 7:
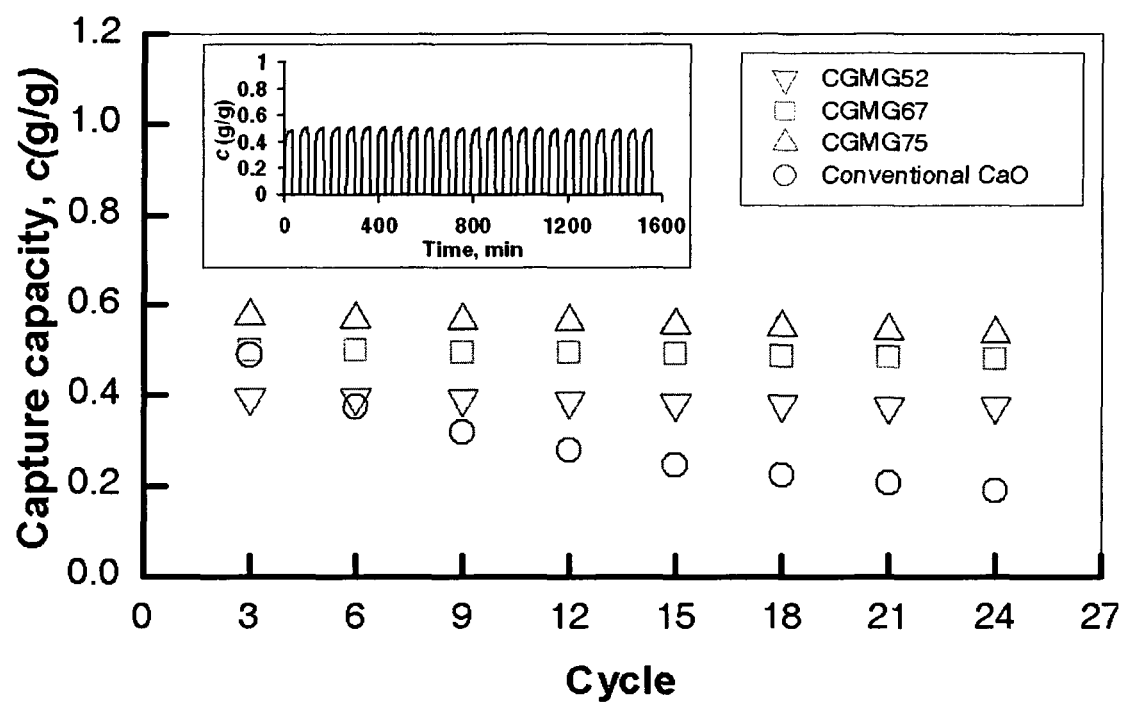
FIG. 7 shows $CO_2$ capture capacity as a function of the number of cycle, for the sorbents with different CaO content (52-75 wt. %) synthesized from calcium D-gluconate monohydrate and magnesium D-gluconate hydrate. Experimental conditions: carbonation at 650° C. for 30 minutes in 15% $CO_2$ and calcination at 900° C. for 10 minutes in 100% $N_2$. The capture capacity profile with time for sorbent CGMG67 is also illustrated.

FIG. 7 shows the capture capacity of three $CO_2$ sorbents as a function of cycle number, produced using calcium D-gluconate monohydrate (as calcium precursor) and magnesium D-gluconate hydrate (as support precursor), as a function of cycle number. The weight fraction of CaO in the sorbents was 52, 67 or 75 wt % (denoted as CGMG52, CGMG67 and CGMG75). FIG. 7 also clearly demonstrates the capture capacity was largely maintained over 24 cycles. In comparison, the capacity of a conventional CaO would decrease to about 24.2% (0.19 g $CO_2$/g sorbent) of its theoretical maximum possible capacity (0.786 g $CO_2$/g sorbent) after 24 cycles. Evidence suggests that there is also a maximum weight fraction of CaO in the sorbent, beyond which the sorbent loses its sintering-resistant property. The observed maximum possible weight fraction of CaO for the sorbent to be sintering resistant (between 75 and 85 wt %) is consistent with the theoretical value, 82.7 wt %, predicted by the 3 dimensional percolation theory. The value corresponding with the theoretical minimum weight percentage of support material to maintain a continuum framework to separate CaO is 17.3 wt % (or 15 vol. %). Theoretically therefore, a $CO_2$ adsorbent according to the present invention should be formed for all weight ratios of CaO to MgO between about 83:17.

Figure 8:
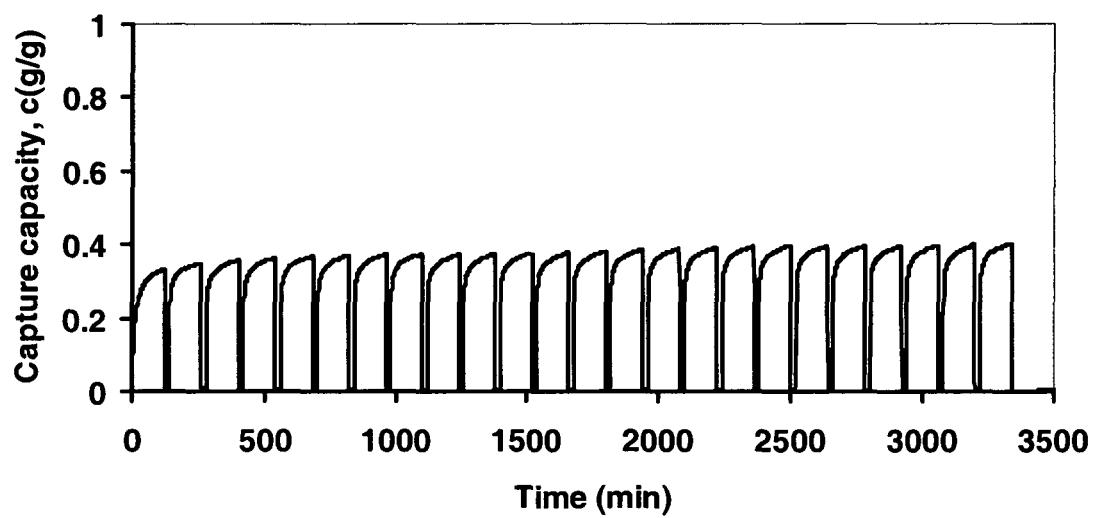
FIG. 8 shows TGA profiles of $CO_2$ capture capacity for sorbent CGMG67 when tested under the derived optimum condition for energy storage systems in the chemical heat pumps.
Figure 10:
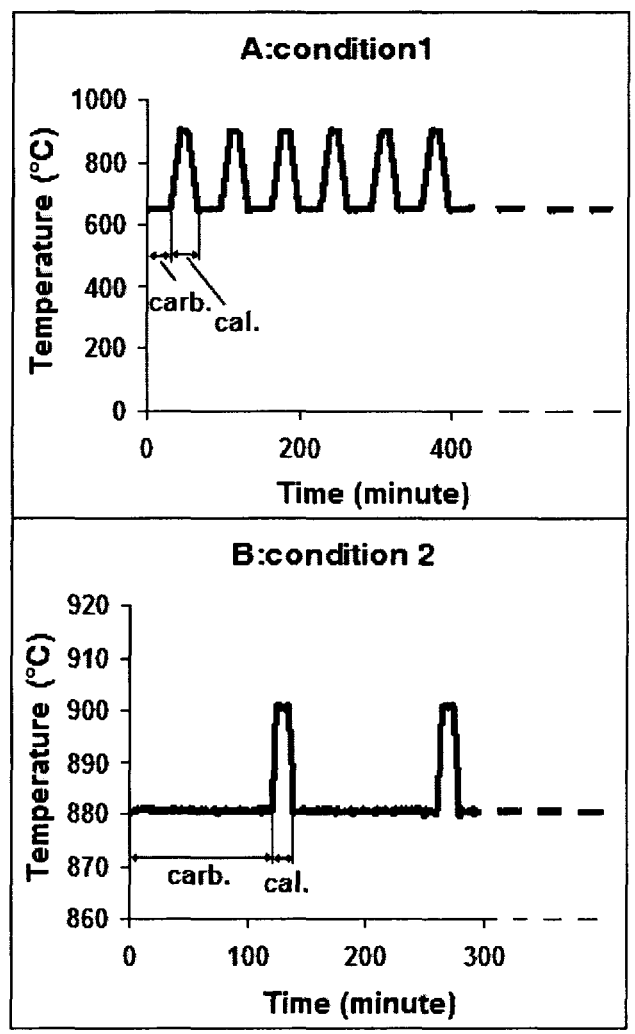
FIG. 10 shows temperature profiles of multiple carbonation-calcination cycles, A: a typical condition (condition1) for AZEP and SE-SMR, B: the optimum condition (condition 2) for energy storage systems in the heat pump systems.

An additional investigation shows that the $CO_2$ capture capacity of our sorbent (e.g. CGMG67) increased from 0.33 g/g at $1^{st}$ cycle to 0.39 g/g at $17^{th}$ cycle (FIG. 8) and then kept constant when tested under the derived optimum carbonation condition in energy storage systems in chemical heat pumps (FIG. 10). Therefore our sorbents are also suitable for these systems, where the carbonation temperature is much higher to store as much energy as possible. The method could also be possibly used or adapted to other applications in which material sintering is of concern, for example in sorbent or catalyst development.

Figure 9:
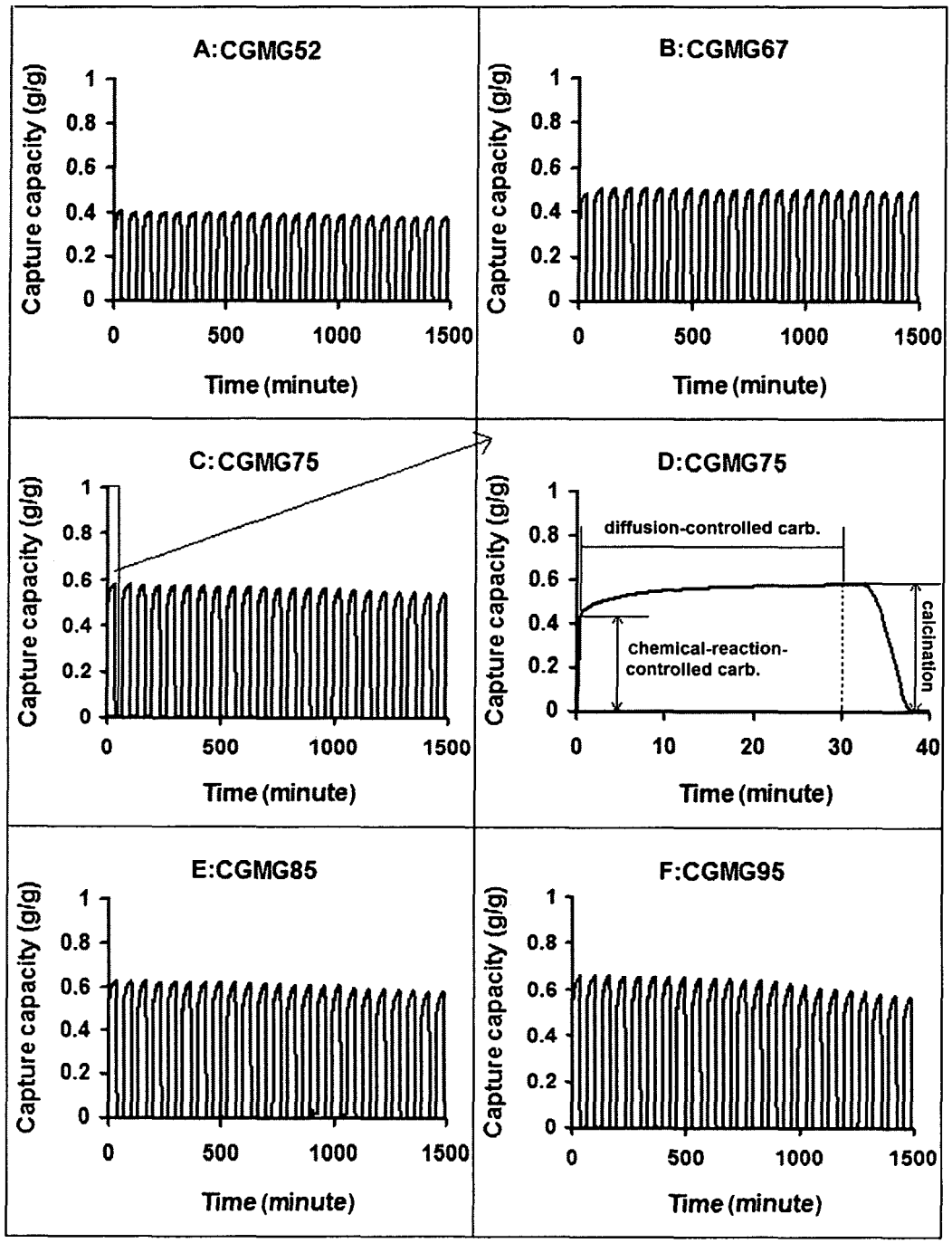
FIG. 9 shows TGA profiles of $CO_2$ capture capacity for sorbents synthesized from CG and MG when tested under the conditions of AZEP and SE-SMR.

FIG. 9 shows TGA profiles of $CO_2$ capture capacity for sorbents synthesized from CG and MG when tested under the conditions of AZEP and SE-SMR.

Figure 11:
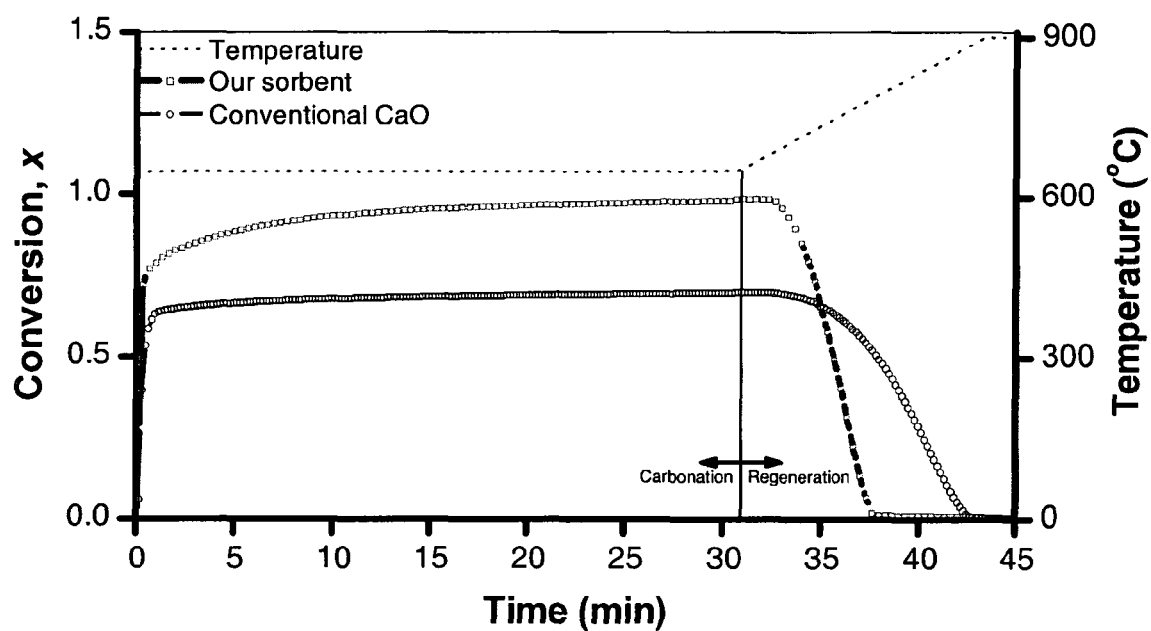
FIG. 11 compares conversions of a typical sorbent synthesized by our method (CGMG75) and conventional CaO at the first capture cycle under typical conditions of AZEP and SE-SMR.

Additionally, the sorbents studied demonstrated a significantly lower temperature of regeneration when compared with conventional CaO. For example, the regeneration completion temperature of CGMG75 (~788° C.) is about 100° C. lower than that of conventional CaO (~890° C.) (FIG. 11). The lower regeneration completion temperature (or faster regeneration rate) translates to a lower heat duty in the regeneration cycle and hence a higher process efficiency which is highly beneficial for AZEP and SE-SMR applications.

Diffraction pattern experiments were performed using an x-ray diffractometer (Bruker D8 Advance) equipped with a Cu tube, graphite monochromator, and scintillation counter.

Figure 12:
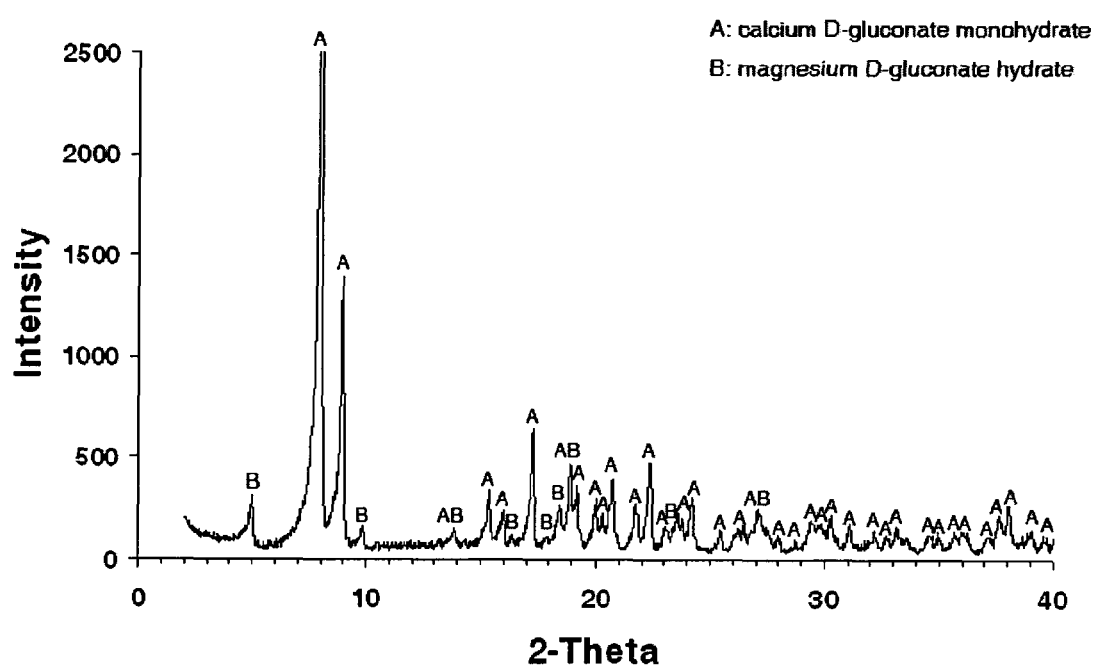
FIG. 12 shows XRD patterns of dried solids after first-heating-step (drying) from solution mixture of calcium D-gluconate monohydrate and magnesium D-gluconate hydrate.

FIG. 12 shows the XRD pattern for the dried solids resulting from the aqueous solution mixture of calcium D-gluconate monohydrate and magnesium D-gluconate hydrate following first heating process (ie drying).

Figure 13:
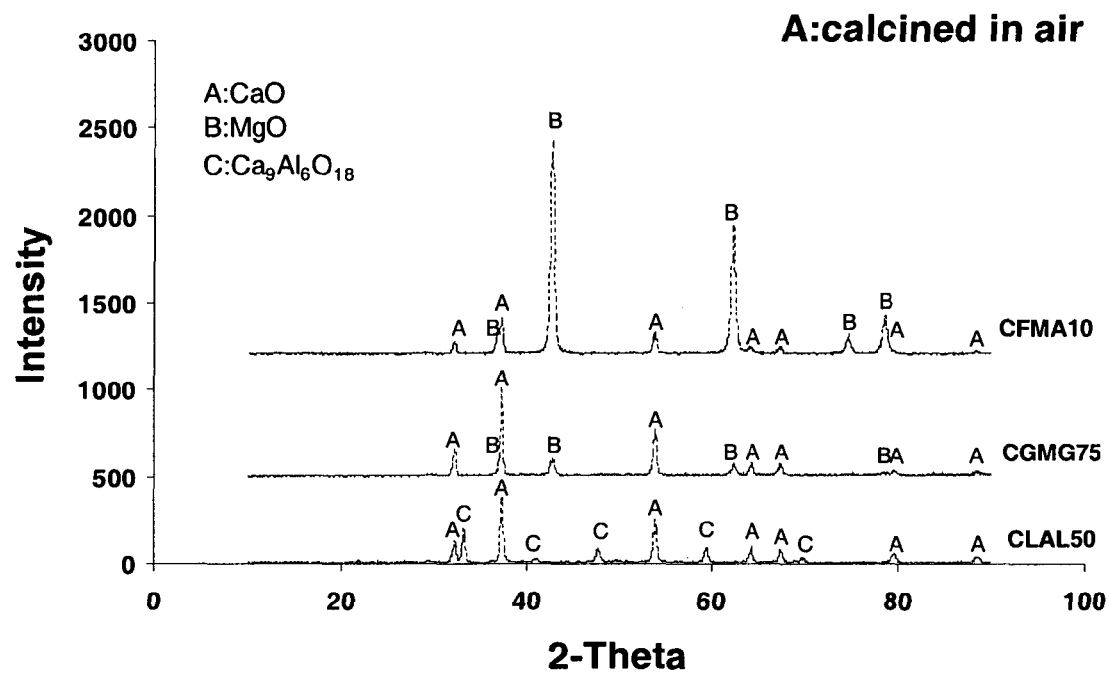
FIG. 13 shows XRD patterns of final sorbents after second-heating-step (calcination) prepared from different precursors and calcined at different gas environments.
Figure 13:
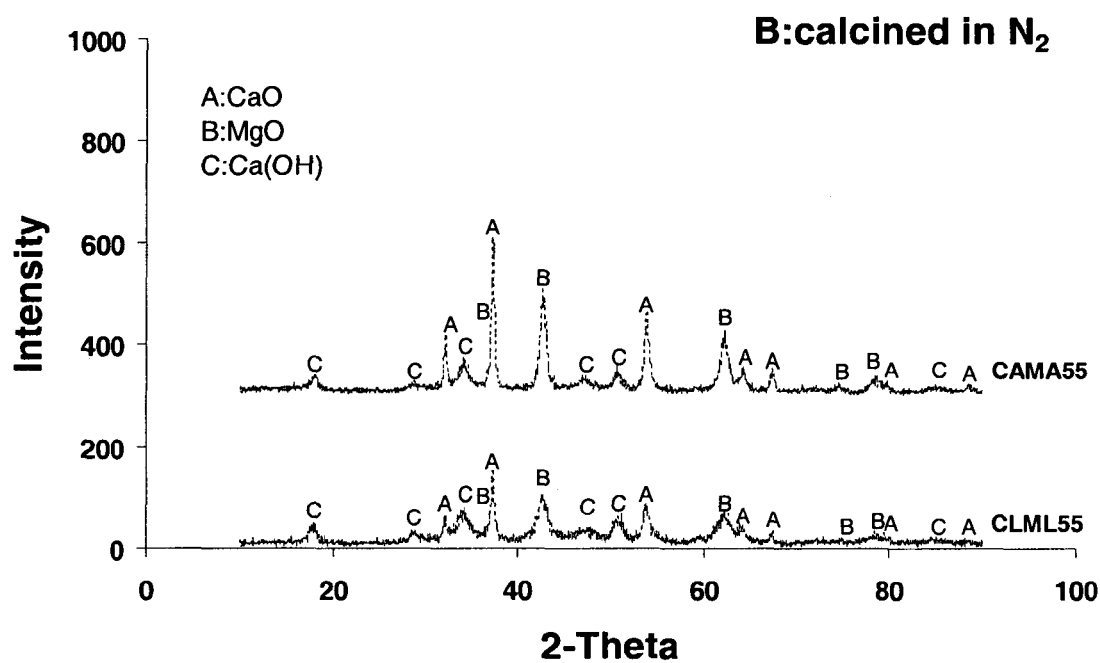

FIG. 13 shows the XRD patterns for five final sorbents (ie after the second heating process (ie calcination)). These sorbents were calcined in a tube furnace in order to obtain sufficient quantity for XRD analysis. It is known that CaO absorbs water vapor in atmosphere quickly so all the samples were taken out of the furnace for XRD analysis when they were still hot to minimize hydration. In some cases, $Ca(OH)_2$ was still observed although a quicker measurement was able to reduce the peaks of $Ca(OH)_2$.

High resolution transmission electron microscopy (HTEM), scanning transmission electron microscopy (STEM) and energy dispersive x-ray (XEDS) analyses were used to investigate sorbent CGMG75 after the second heating step (ie calcination). The procedure was as follows:
1. The sample (a mixture of CaO and MgO) was dispersed in high purity ethanol;
2. A few drops of the suspension were transferred by pipette onto the carbon film supported by a 300 mesh copper TEM grids; and
3. Images were taken in a Philips Tecnai 20 FEG analytical electron microscope (FEG-AEM) operating at 200 kV, fitted with an EDAX thin-window energy dispersive X-ray (XEDS) detector for detecting elements.

Figure 14:
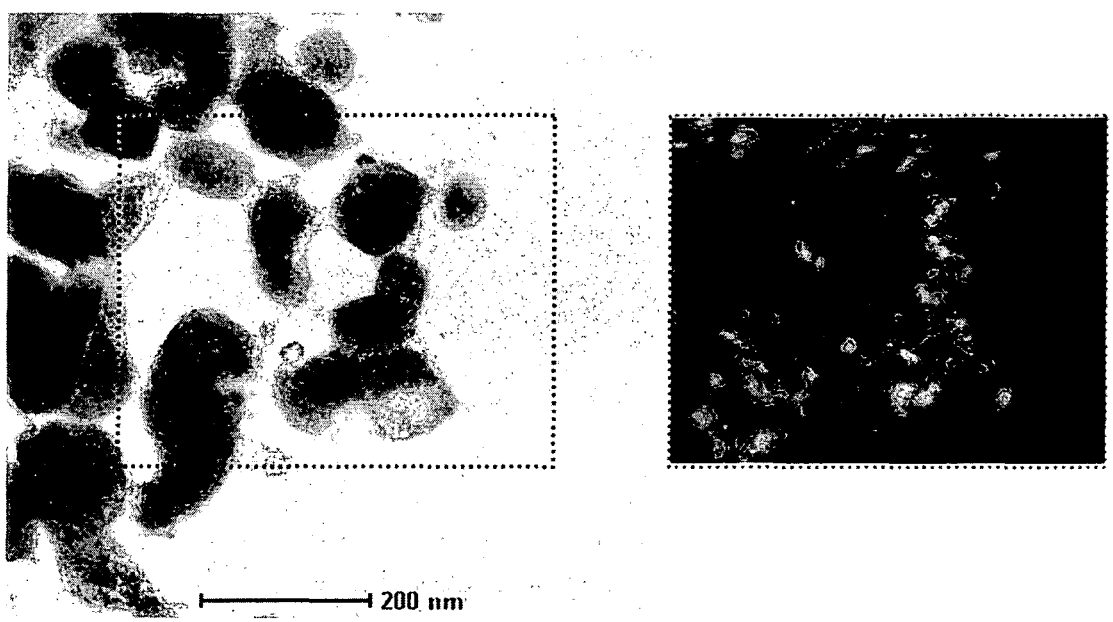
FIG. 14 shows a scanning transmission electron microscopy (STEM) image of a typical sorbent (CGMG75) and the corresponding STEM-EDS maps of the Ca-Kα and Mg-Kα signals in a selected area (Ca, dark/larger; Mg, lighter/smaller).

The results are shown in FIG. 14. The sintering-resistant nature of the sorbents is believed to be owing to the inert support material effectively and uniformly separating the CaO particles. Scanning transmission electron microscopy (STEM) of sorbent CGMG75, presented as a bright-field image and energy-dispersive x-ray (XEDS) maps in FIG. 14, shows the formation of CaO particles of ~36 and ~120 nm, with nanocrystalline domains of MgO (~9 and ~50 nm) uniformly adhered to their surfaces. We believe that finely mixed salts of calcium gluconate and magnesium gluconate as confirmed by XRD patterns (FIG. 12) are precipitated from the aqueous solution mixture in the first heating process (drying). Subsequently uniformly distributed CaO and MgO nanocrystalline domains are formed in the course of multi-step decomposition of these precursors (FIG. 1) in the second heating process (calcination). Temperatures typically reach 900° C., the MgO particles, with a sintering temperature of 1289° C., act as a physical barrier to prevent the sintering and aggregation of the $CaCO_3$ nanoparticles, which typically sinter at 527° C. Therefore the high $CO_2$ capture capacity of the sorbent is maintained over a multitude of carbonation-regeneration cycles.

Figure 16:
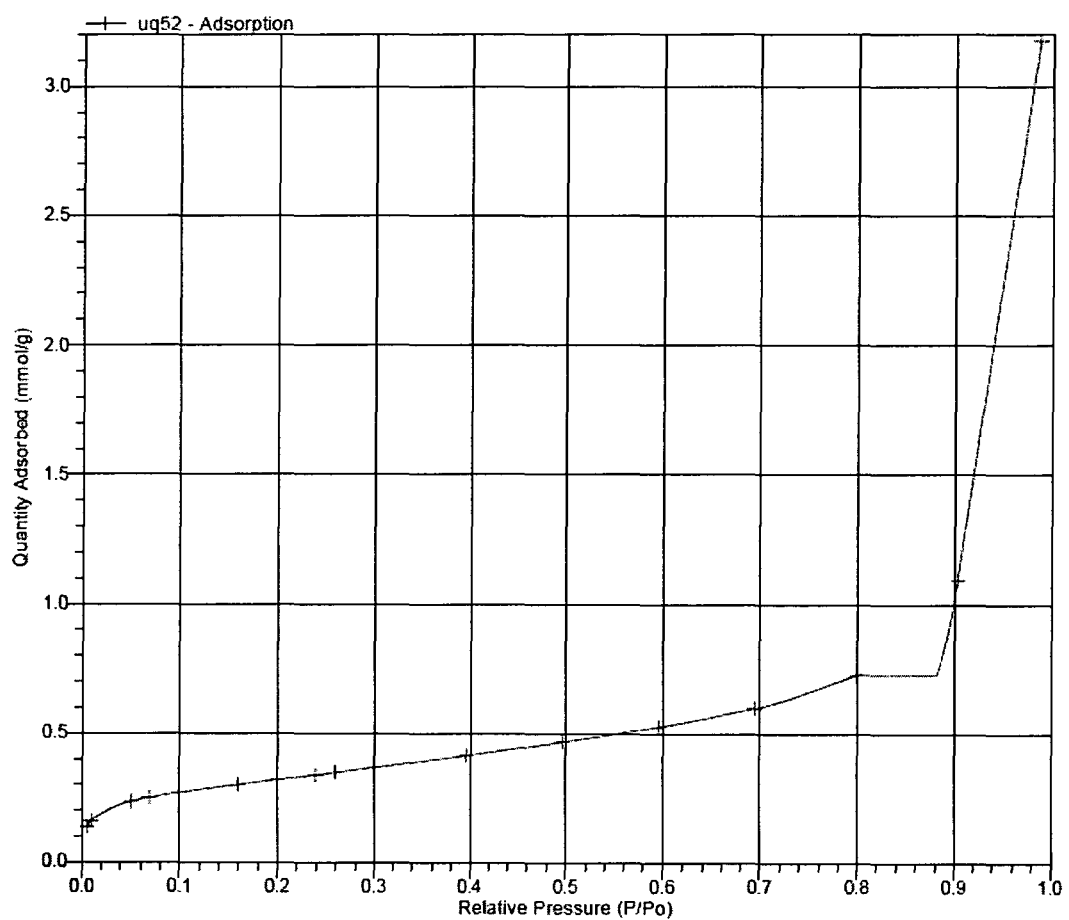
FIG. 16 shows the N2 adsorption isotherm for CGMG52 (CaO content 52 wt % in MgO).
Figure 17:
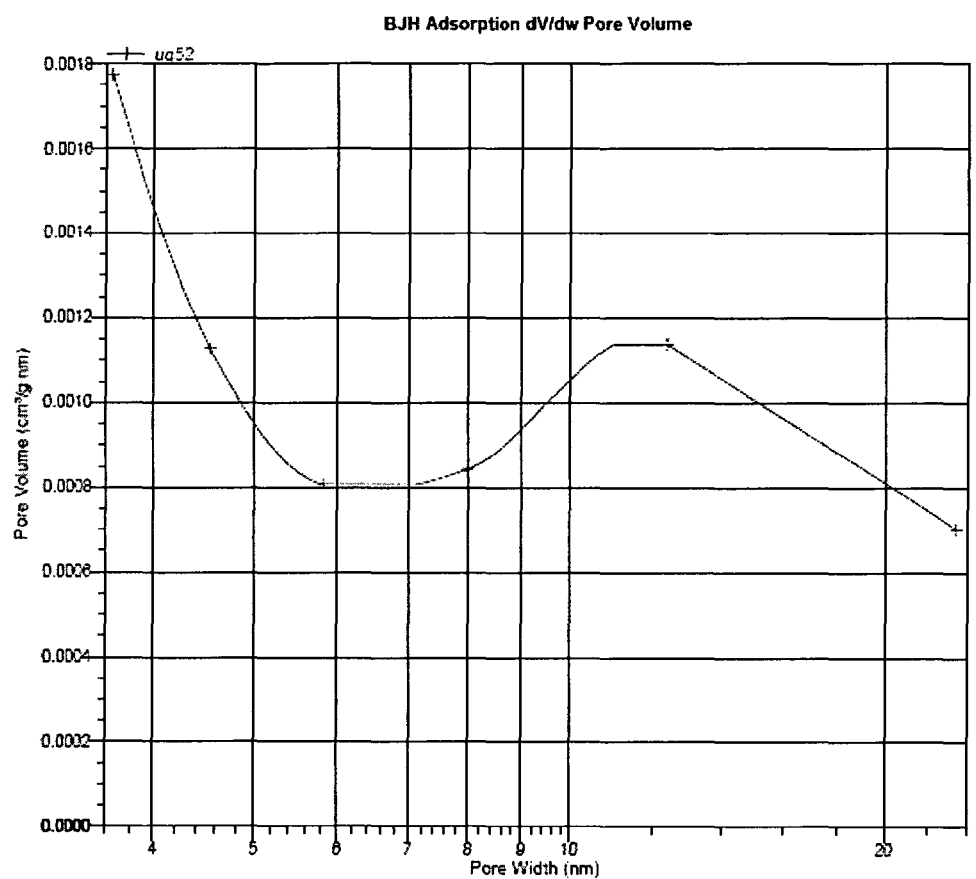
FIG. 17 shows the BJH pore size distribution of CGMG52 (CaO content 52 wt % in MgO).
Figure 18:
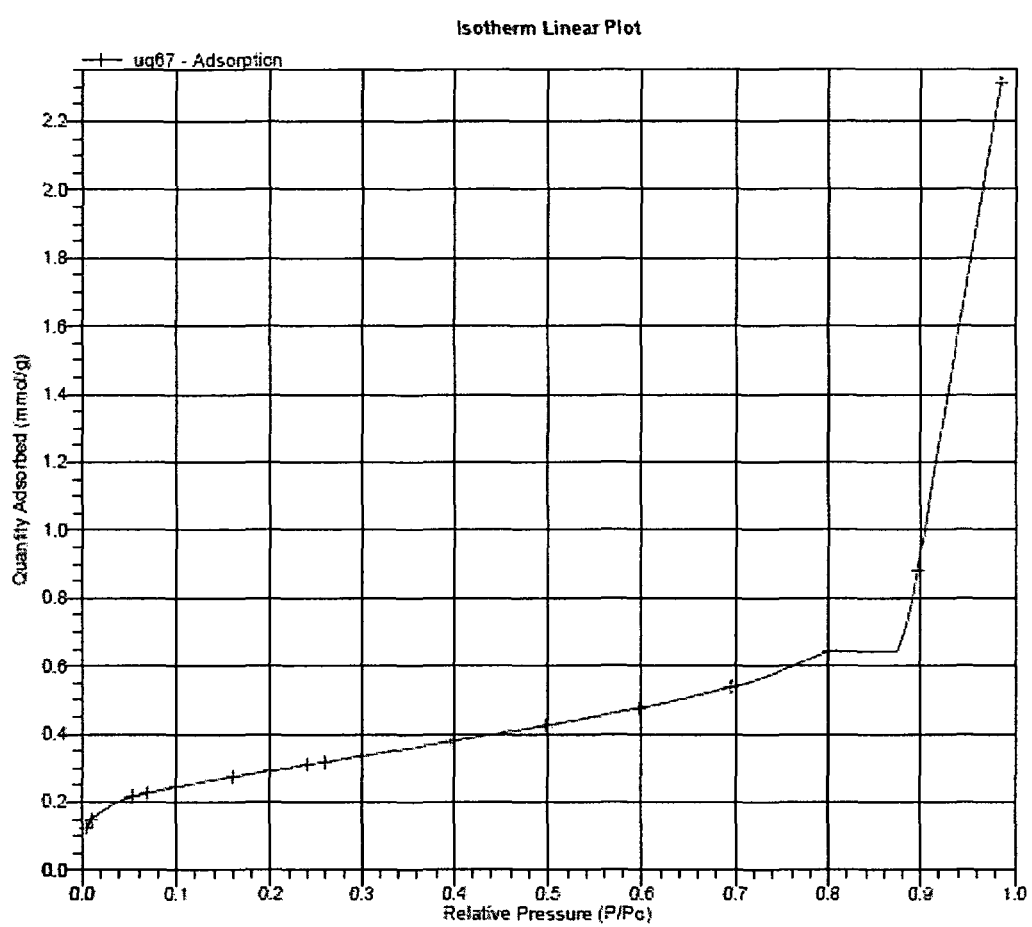
FIG. 18 shows the N2 adsorption isotherm for CGMG67 (CaO content 67 wt % in MgO).
Figure 19:
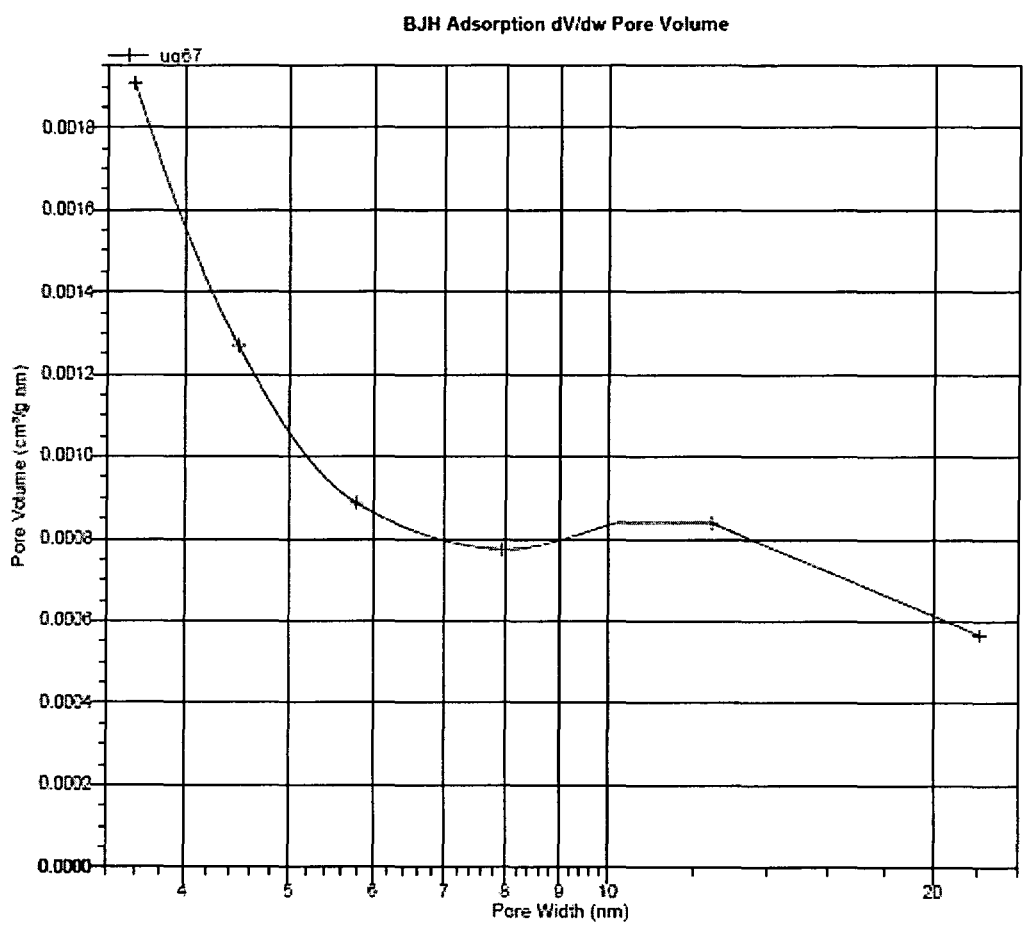
FIG. 19 shows the BJH pore size distribution of CGMG67 (CaO content 67 wt % in MgO).

BET surface area and porosity were measured by N2 adsorption at liquid nitrogen temperature. The nitrogen adsorption isotherm and BJH pore size distribution are shown in FIGS. 16 and 17, respectively, for CGMG52. The nitrogen adsorption isotherm and BJH pore size distribution are shown in FIGS. 18 and 19, respectively, for CGMG67. The BET surface areas were 25.7 $m^2/g$ and 23.5 $m^2/g$ for CGMG52 and CGMG67, respectively.

2. Preparation of the Calcium Aluminium Oxide (CAO) Sorbent

The preparation of the CMO sorbent in accordance with an embodiment of the invention is described as follows: 1.3 g aluminum nitrate nonahydrate ($Al(NO_3)_3 \cdot 9H_2O$) and 1.4 g of calcium oxide (calcined calcium acetate hydrate) were mixed with 25 ml 2-propanol and 228 ml distilled water in a container. The weight ratios of calcium oxide to $Ca_{12}Al_{14}O_{33}$ (support) then can be calculated to be 55/45. The solution was stirred for 1 h at 75° C. and dried at 110° C. for overnight. The sample was then calcined at 900° C. for 30 minutes in 100% $N_2$ in the TGA.

Determination of Masses of CAO Precursors Before Synthesis

When the aluminum precursor was chosen, the weight ratio of aluminum L-lactate and final product of $Ca_9Al_6O_{18}$ was determined by molecular weights relations (the weight ratio between calcium L-lactate hydrate and CaO was still determined by experimental ratio in Table S1).

3. Summary

Figure 15A:
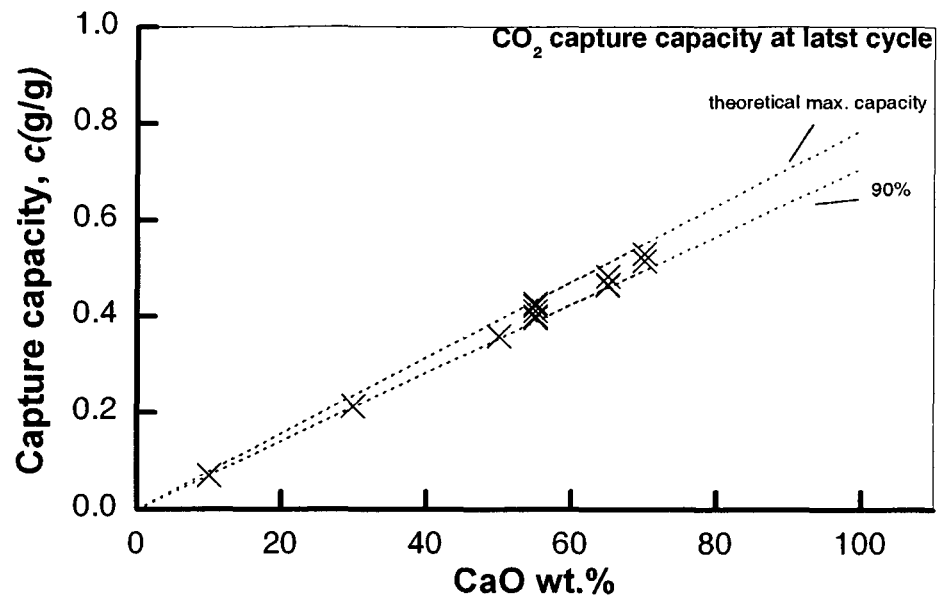
FIG. 15 (A) shows a summary of $CO_2$ capture capacity of last cycle for synthesized sorbents except that from CG and MG, while (B) shows a summary of $CO_2$ capture capacity of last cycle for CGMG sorbents including materials with CaO amounts of 52, 67, 75, 85, 95, and 100 (ie control) wt %.
Figure 15B:
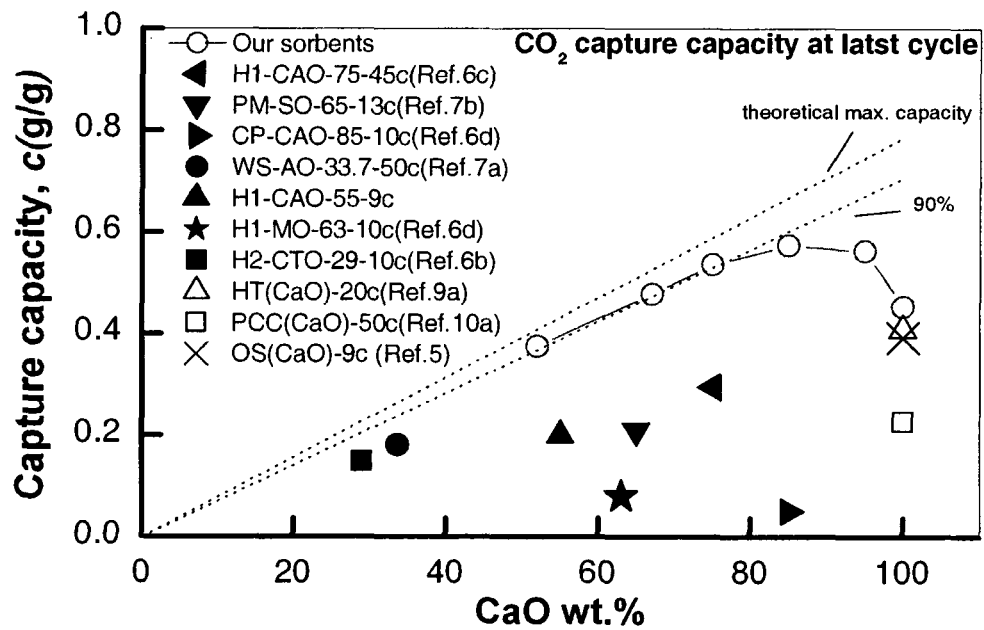

To further explore the viability of our new method, a range of sorbents were produced with different combinations of precursors, as shown in Table 1. The precursors used included calcium acetate hydrate, calcium L-lactate hydrate, calcium formate, magnesium acetate, magnesium L-lactate hydrate, or aluminium lactate. The results are shown in FIG. 15. When magnesium acetate or magnesium L-lactate hydrate was used as the support material precursor in conjunction with any calcium precursor, the sorbents produced contained CaO and MgO. However if aluminium lactate was used as the support material precursor with calcium L-lactate hydrate, then calcium aluminium oxide ($Ca_9Al_6O_{18}$) was formed as the 75%. All showed a high capture capacity close to the theoretical maximum, and also the capacity retained over cycles. Therefore a considerable array of different sorbents with sintering-resistant properties can be synthesized using our method. These sorbents all potentially possess the desired chemical properties for utilization in AZEP and SE-SMR technologies.

TABLE 1

Preparation conditions for sorbents and the support matrixes in final sorbents.

| Sample | Cal. atm. | Cal. time (h) | CaO wt. % | Support matrix |
|---|---|---|---|---|
| CGMG52 | Air, furnace | 1.5 | 52 | MgO |
| CGMG67 | Air, furnace | 1.5 | 67 | MgO |
| CGMG75 | Air, furnace | 1.5 | 75 | MgO |
| CGMG85 | Air, furnace | 1.5 | 85 | MgO |
| CGMG95 | Air, furnace | 1.5 | 95 | MgO |
| CLAL50 | Air, furnace | 0.5 | 50 | $Ca_9Al_6O_{18}$ |
| CFMA10 | Air, furnace | 0.5 | 10 | MgO |
| CAMA30 | $N_2$, TGA | 0.5 | 30 | MgO |
| CAMA55 | $N_2$, TGA | 0.5 | 55 | MgO |
| CAMA65 | $N_2$, TGA | 0.5 | 65 | MgO |
| CAMA70 | $N_2$, TGA | 0.5 | 70 | MgO |
| CLML55 | $N_2$, TGA | 0.5 | 55 | MgO |
| CLML65 | $N_2$, TGA | 0.5 | 65 | MgO |

TABLE 1-continued

Preparation conditions for sorbents and the support matrixes in final sorbents.

| Sample | Cal. atm. | Cal. time (h) | CaO wt. % | Support matrix |
| --- | --- | --- | --- | --- |
| CLML70 | $N_2$, TGA | 0.5 | 70 | MgO |
| CAML55 | $N_2$, TGA | 0.5 | 55 | MgO |
| CAML65 | $N_2$, TGA | 0.5 | 65 | MgO |
| CAML70 | $N_2$, TGA | 0.5 | 70 | MgO |
| CLMA55 | $N_2$, TGA | 0.5 | 55 | MgO |
| CACLMAML50 | $N_2$, TGA | 0.5 | 50 | MgO |

The notations are: CG: calcium D-gluconate monohydrate (≥98%, Sigma-Aldrich), CA: calcium acetate hydrate (~99%, Sigma-Aldrich), CL: calcium L-lactate hydrate (≥98%, Fluka), CF: calcium formate (≥99, Fluka), MA: magnesium acetate tetrahydrate (>99%, Amresco), ML: magnesium L-lactate hydrate (≥95, Fluka), MG: magnesium D-gluconate hydrate (≥98%, Sigma), AL: Aluminum L-lactate (97%, Aldrich), 10 (30, 50, 52, 55, 65, 67, 70, 75, 85, 95): the weight fraction of CaO in the sorbent. The sorbent CACLMAML was produced from CA and CL as Ca precursors, and MA and ML as Mg precursors.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of producing a $CO_2$ adsorbent, including the steps of:
    (a) producing a mixture of at least one calcium salt and at least one metal support cation which is not calcium in at least one solvent, wherein the calcium salt is completely soluble in the at least one solvent, and wherein the mixture is produced by
        (i) adding an organic calcium salt and at least one organic metallic salt to the at least one solvent; or
        (ii) adding a compound or mineral to the at least one solvent, the compound or mineral comprising both a calcium oxide to provide calcium ions for the at least one calcium salt, and one or more metal oxides to provide at least one metal ion selected from the group consisting of magnesium, aluminum, silicon, titanium, lanthanum, cerium, zirconium and hafnium;
    (b) solidifying the mixture by evaporating the solvent from the mixture to produce a solid containing a calcium metal salt; and
    (c) calcining the dried solid to produce a sorbent of calcium oxide particles separated by grains of a porous metal oxide support, the calcium oxide particles having a size of about 36 nm to about 150 nm in diameter.

2. The method of producing the $CO_2$ adsorbent of claim 1, wherein the metal organic salt is selected from the group consisting of metal acetate, metal benzoate, metal propionate, metal citrate, metal lactate, metal gluconate, metal formate and metal stearate, and the solvent is selected from the group consisting of water, mineral acid, organic acid and low molecular weight alcohol.

3. The method of producing the $CO_2$ adsorbent of claim 1, wherein the one or more metal oxides are selected from the group consisting of magnesium oxide, aluminium oxide, silicon oxide, titanium oxide, lanthanum trioxide, cerium oxide, zirconium oxide, and hafnium oxide, and compounds or minerals containing any of these oxides.

4. The method of producing the $CO_2$ adsorbent of claim 3 wherein the metal oxide is magnesium oxide.

5. The method of producing the $CO_2$ adsorbent of claim 1, wherein the solvent is an organic acid selected from the group consisting of acetic acid, benzoic acid, propionic acid, citric acid, lactic acid, gluconic acid, formic acid and stearic acid.

6. The method of producing the $CO_2$ adsorbent of claim 1, wherein the compound or mineral is dolomite.

7. The method of producing the $CO_2$ adsorbent of claim 1 wherein the at least one calcium salt and the at least one metal support cation is added in an amount which results in a calcium oxide content of greater than 0 wt % to about 95 wt % in the final adsorbent.

8. The method of claim 7 wherein the at least one calcium salt and the at least one metal support cation is added in an amount which results in a calcium oxide content of about 10 wt % to about 83 wt % in the final adsorbent.

9. The method of claim 7 wherein the at least one calcium salt and the at least one metal support cation is added in an amount which results in a calcium oxide content of greater than about 67 wt % to about 83 wt % in the final adsorbent.

10. The method of claim 7 wherein the mixture includes calcium oxide and one or more metal oxides.

11. The method of producing the $CO_2$ adsorbent of claim 10 wherein the one or more metal oxides is selected from the group consisting of magnesium oxide, aluminium oxide, silicon oxide, titanium oxide, lanthanum trioxide, cerium oxide, zirconium oxide, and hafnium oxide, and compounds or minerals containing any of these oxides.

12. The method of producing the $CO_2$ adsorbent of claim 11 wherein the metal oxide is magnesium oxide.

13. The method of claim 1, wherein the grains of the porous metal support that separate the calcium oxide particles are about 9 nm to about 50 nm in diameter.

14. A method of producing a $CO_2$ adsorbent, including the steps of:
    (a) producing a mixture of at least one calcium salt and at least one metal support cation in at least one solvent, wherein the calcium salt is completely soluble in the at least one solvent, and wherein the mixture is produced by adding a compound or mineral to the at least one solvent, the compound or mineral comprising both calcium oxide and at least one metal oxide which forms the at least one metal support cation in the solvent, wherein the at least one metal support cation is selected from the group consisting of magnesium, aluminum, silicon, titanium, lanthanum, cerium, zirconium, and hafnium;
    (b) solidifying the mixture by evaporating the solvent from the mixture to produce a solid containing a calcium metal salt; and
    (c) calcining the dried solid to produce a sorbent of calcium oxide particles separated by grains of a porous metal oxide support, the calcium oxide particles having a size of about 36 nm to about 150 nm in diameter.

\* \* \* \* \*